US010242013B2

(12) United States Patent
Eda et al.

(10) Patent No.: US 10,242,013 B2
(45) Date of Patent: Mar. 26, 2019

(54) SNAPSHOT MANAGEMENT USING HEATMAPS IN A LARGE CAPACITY DISK ENVIRONMENT

(71) Applicant: International Business Machines Corporation, Armonk, NY (US)

(72) Inventors: Sasikanth Eda, Vijayawada (IN); Shah M. R. Islam, Tucson, AZ (US); John T. Olson, Tucson, AZ (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/690,314

(22) Filed: Aug. 30, 2017

(65) Prior Publication Data

US 2017/0364525 A1 Dec. 21, 2017

Related U.S. Application Data

(63) Continuation of application No. 14/962,011, filed on Dec. 8, 2015, now Pat. No. 9,886,440.

(51) Int. Cl.
*G06F 3/06* (2006.01)
*G06F 17/30* (2006.01)

(52) U.S. Cl.
CPC ........ *G06F 17/30088* (2013.01); *G06F 3/065* (2013.01); *G06F 3/067* (2013.01); *G06F 3/0619* (2013.01); *G06F 3/0643* (2013.01); *G06F 3/0647* (2013.01)

(58) Field of Classification Search
CPC ...... G06F 3/0619; G06F 3/0647; G06F 3/065; G06F 17/3088

USPC .................................................. 711/161, 162
See application file for complete search history.

(56) References Cited

U.S. PATENT DOCUMENTS

| 9,009,384 | B2 | 4/2015 | Nathuji et al. |
|---|---|---|---|
| 9,658,781 | B2 | 5/2017 | Dolph et al. |
| 2002/0103969 | A1 | 8/2002 | Koizumi et al. |
| 2003/0163457 | A1 | 8/2003 | Yano et al. |
| 2009/0113160 | A1 | 4/2009 | Ferraro |
| 2009/0204650 | A1 | 8/2009 | Wong et al. |
| 2011/0191555 | A1 | 8/2011 | Narayanan |
| 2013/0275653 | A1 | 10/2013 | Ranade et al. |
| 2014/0208020 | A1 | 7/2014 | Benhase et al. |

(Continued)

OTHER PUBLICATIONS

Bhadkamkar et al., "BORG: Block-reORGanization for Self-optimizing Storage Systems", 7th USENIX Conference on File and Storage Technologies FAST '09, USENIX Association Berkeley, CA, USA, pp. 183-196.

(Continued)

*Primary Examiner* — Than Nguyen
(74) *Attorney, Agent, or Firm* — David B. Woycechowsky

(57) ABSTRACT

A method, computer program product and/or system saves an original logical block in a file system and generates a first heatmap reflecting access operations on the original logical block. After taking of a file system snapshot, and receiving information that the original logical block is going to be revised, a second heatmap is generated, reflecting predicted access operations on the revised logical block. The second heatmap is based, at least in part, on the first heatmap. Selecting a physical storage location for the revised logical block is based on the second heatmap.

10 Claims, 6 Drawing Sheets

(56) References Cited

U.S. PATENT DOCUMENTS

| | | | |
|---|---|---|---|
| 2015/0006787 A1* | 1/2015 | Liu .................... | G06F 3/0604 711/103 |
| 2015/0106578 A1 | 4/2015 | Warfield et al. | |
| 2015/0286436 A1* | 10/2015 | Olson .................. | G06F 3/0619 711/162 |
| 2015/0355837 A1 | 12/2015 | Bish et al. | |
| 2016/0011979 A1 | 1/2016 | Islam et al. | |
| 2016/0283140 A1* | 9/2016 | Kaushik ............... | G06F 3/0643 |
| 2017/0071056 A1 | 3/2017 | Stoev et al. | |
| 2017/0161286 A1 | 6/2017 | Eda et al. | |
| 2018/0067655 A1 | 3/2018 | Greenfield et al. | |

OTHER PUBLICATIONS

Garimella, Neeta, "Understanding and exploiting snapshot technology for data protection, Part 1: Snapshot technology overview", IBM, Apr. 26, 2006, <http://www.ibm.com/developerworks/tivoli/library/t-snaptsm1/>, 14 pages.

Mearian, Lucas, "WD leapfrogs Seagate with world's highest capacity 10TB helium drive, new flash drives", Computerworld, Sep. 9, 2014 12:05 PM PT, <http://www.computerworld.com/article/2604311/wd-leapfrogs-seagate-with-world-s-highest-capacity-10tb-helium-drive-new-flash-drives.html>, 6 pages.

"Are partitions to the inner/outer edge significantly faster", Super User, asked Sep. 9, 2013, edited Sep. 10, 2013, 6 pages, <http://superuser.com/questions/643013/are-partitions-to-the-inner-outer-edge-significantly-faster>.

"Copy-on-write", Wikipedia, the free encyclopedia, Sep. 26, 2015, <https://en.wikipedia.org/w/index.php?title=Copy-on-write&oldid=682845683>, 3 pages.

"Instantaneous File-System Snapshots—How They Work", © 2009 Darel Rex Finley, downloaded from the internet on Nov. 19, 2015, 6 pages, <http://alienryderflex.com/snapshots/>.

"What is Storage Snapshot Technology?", StoneFly, provided by inventor in main idea of disclosure dated Nov. 23, 2014, <http://www.stonefly.com/resources/Storage-Snapshot-Technology.asp>, 3 pages.

"Why You Need More Space Than You You Need", last updated Dec. 1, 2010, Mac Performance Guide, <http://macperformanceguide.com/Storage-WhyYouNeedMoreThanYouNeed.html>, 9 pages.

Eda et al., "Efficient Snapshot Management in a Large Capacity Disk Environment", U.S. Appl. No. 15/851,974, filed Dec. 22, 2017.

List of IBM Patents or Patent Applications Treated as Related, Filed Dec. 22, 2017, 2 pages.

List of IBM Patents or Patent Applications Treated as Related, Filed Aug. 30, 2017, 2 pages.

* cited by examiner

SNAPSHOT MANAGEMENT USING HEATMAPS IN A LARGE CAPACITY DISK ENVIRONMENT

BACKGROUND

The present invention relates generally to the field of snapshot management for computer data storage software, and more particularly to snapshot management for software managing and controlling a large capacity disk type data storage device such as a shingled magnetic recording/high storage density storage system.

A file system defines rules for naming files and placing them on a storage device for storage and retrieval. File system functionality can be divided into two components: a user component and a storage component. The user component is responsible for managing files within directories, file path traversals and user access to the files. The storage component of the file system determines the physical locations where files are stored on the storage device.

In conventional storage systems, a file system snapshot is a record of the state of a storage device or file system at any given moment in time. The snapshot is a guide for restoring a file, a storage device or a file system in the event, for example, that the storage device fails. Typically, a snapshot is made essentially instantly, and is made available for use by other applications for purposes such as: (i) data protection; (ii) data analysis and reporting; and/or (iii) data replication.

In some snapshot implementations, (including copy-on-write snapshot implementations, which will be further discussed below), a snapshot is a record of the state of a file system including the date and time the snapshot was taken. After a snapshot is taken, if a file, or a portion of the file (herein called a data block, or a block) is to be updated, a new instance of the data block is created and stored at a physical address different from the original data block. The new instance becomes the active block and the previous instance now becomes an inactive block. The file system, while keeping the inactive data block intact, updates its pointers to reference the active data block. To a typical user, nothing appears to have changed. The inactive data block (sometimes called the snapshot data), which is no longer accessible to some software, remains on the storage device and can be re-activated by an operation to restore the file (or even the whole file system) to the state at which it existed at the time the snapshot was taken. The active data block is stored on the storage device at a physical address that may have a shorter or longer access time relative to the inactive data block, and, consequently, a user may experience a change in the response time of the file system when an access operation involves the updated file.

The active data block (sometimes herein variously referred to as the "latest data", the "live data" or the "primary data") continues to be available to applications without interruption, while the inactive data block: (i) is used to perform other functions on the data; (ii) enables improved application availability; (iii) enables faster recovery from failures or service interruptions; (iv) enables easier back up management of large volumes of data; (v) reduces exposure to data loss; (vi) virtually eliminates backup windows; and/or (vii) lowers total cost of ownership of a backup solution.

In a conventional storage system with "multi-tier" architecture, different categories of data are respectively stored on different "tiers" of the storage system, typically based on criteria such as: frequency of use; security requirements; data recovery requirements; and/or other access-related criteria. Examples of different storage tiers include: (i) SSD (solid state storage device); (ii) SAS (serial attached SCSI); (iii) nearline SAS, etc. Different tiers basically represent different classes or qualities of service. The tier classification can vary based on factors such as speed, cost etc.

On some disk-type storage devices, there is a linear speed ratio between tracks stored on an outer partition and tracks stored on an inner partition. The speed ratio typically is close to 5/3 (outer/inner). For example, a drive that is capable of 120 MB/sec data transfer speed with respect to data on the outer tracks might yield only 72 MB/sec data transfer speed with respect to data stored on the inner tracks.

In some conventional systems, "copy-on-write" (COW) is the underlying mechanism for disk storage snapshots. In some COW data storage systems, multiple versions (for example, a version corresponding to each successive instance of a snapshot followed by a write operation) of an inactive data block are retained, and accumulated since the time the data block first came into existence.

In a large disk environment (for example a shingled magnetic recording/high storage density or SMR storage system), tiered storage can be implemented wherein data with high access frequency are moved onto outer tracks (which can deliver higher read/write speed), and low frequency/archival data are moved onto inner tracks (which delivers comparatively lower read/write speed).

SUMMARY

According to an aspect of the present invention, there is a method, computer program product and/or system that performs the following operations (not necessarily in the following order): (i) saving an original logical block in a file system at a first physical location; (ii) generating a first heatmap reflecting access operations on the original logical block; (iii) taking of a first snapshot with respect to at least a portion of the file system including the original logical block; (iv) receiving information that the original logical block is going to be revised into a revised logical block; (v) generating a second heatmap reflecting predicted access operations on the revised logical block, with the second heatmap being based at least in part on the first heatmap; (vi) selecting a second physical storage location for the revised logical block based at least in part on the second heatmap; and (vii) saving the revised logical block at the second physical storage location.

DETAILED DESCRIPTION

Figure 1A:
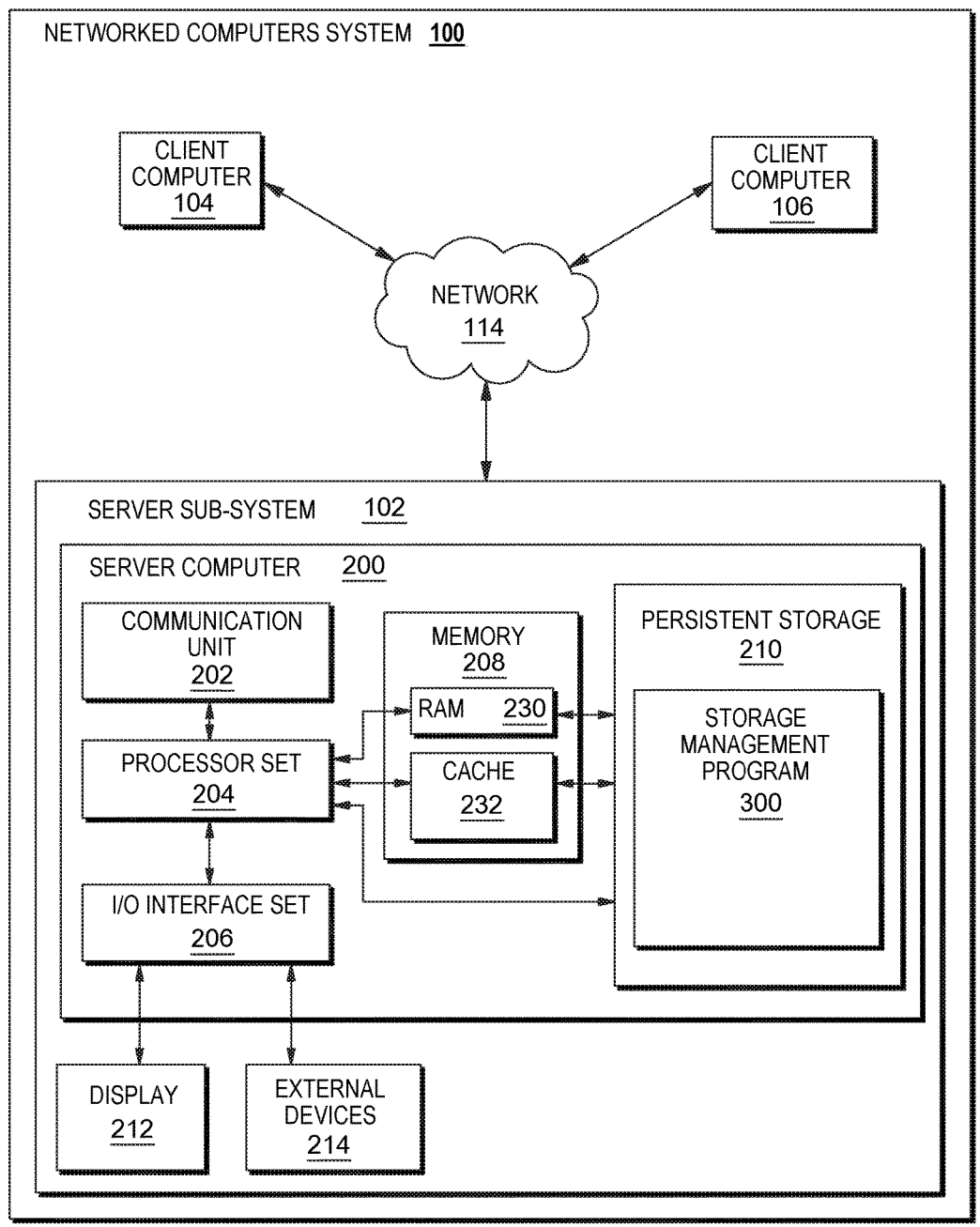
FIG. 1A is a block diagram view of a first embodiment of a system according to the present invention.

A method for determining optimal placement of logical blocks in storage systems of tiered architecture, to efficiently manage high performance tiers in a multi-tier storage architecture (large disk capacity environment). Performed at a first write operation after a snapshot creation, the method is based on heatmaps (access history) of the logical blocks. A proportion of heatmap information is transferred from an existing logical block to a corresponding new logical block based on predicted application behavior. The new logical block is placed on inner or outer disk tracks during a first write after snapshot (COW-copy on write). Placement of the logical block is based on the heatmap information from the old logical block. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1A is a functional block diagram illustrating various portions of networked computers system 100, including: server sub-system 102; client computers 104 and 106; communication network 114; server computer 200; communication unit 202; processor set 204; input/output (I/O) interface set 206; memory device 208; persistent storage device 210; display device 212; external device set 214; random access memory (RAM) devices 230; cache memory device 232; and storage management program 300.

Figure 1B:
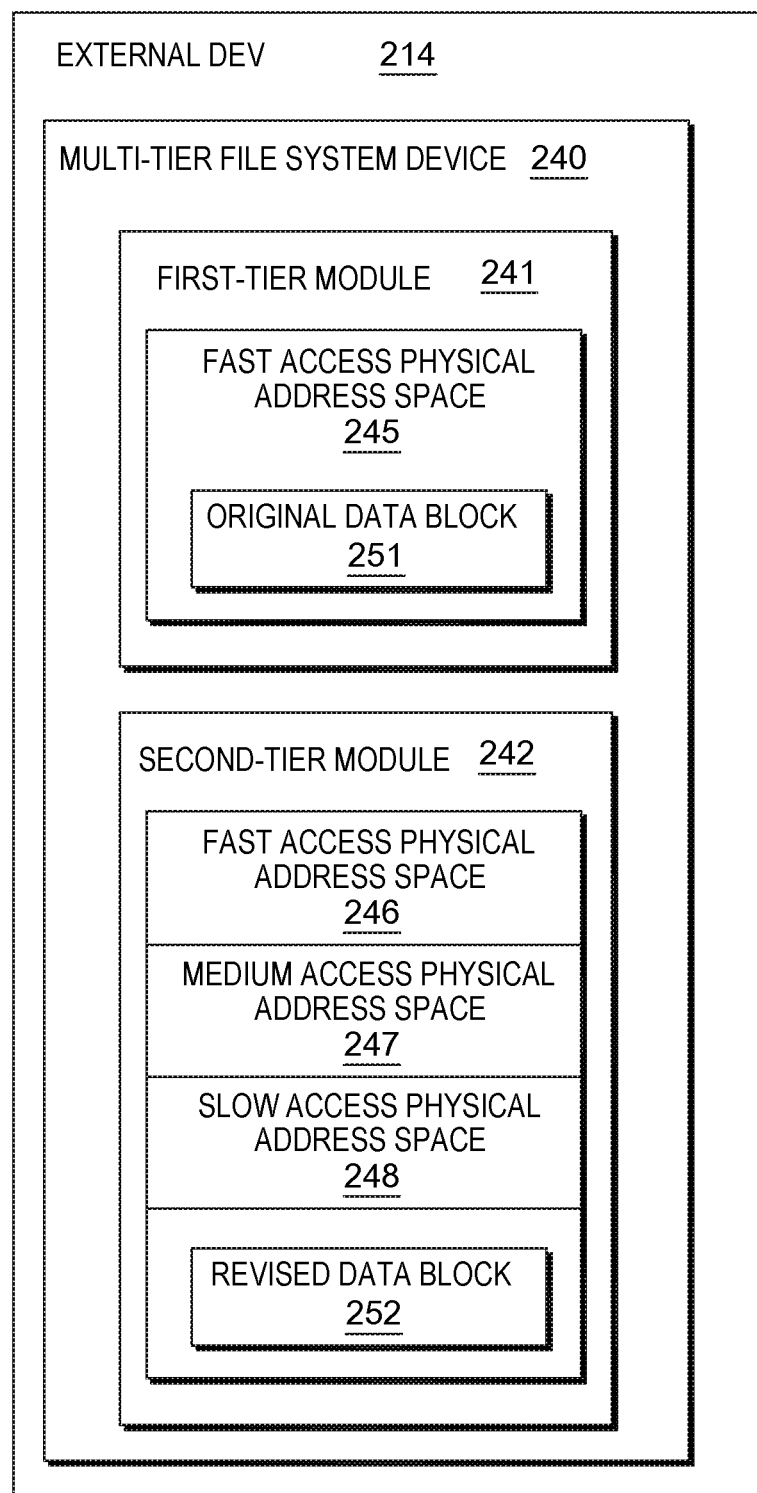
FIG. 1B is a block diagram view of a first embodiment of a system according to the present invention.

FIG. 1B is a functional block diagram illustrating various portions of external device set 214, including: multi-tier file system device 240; first-tier module 241; fast access physical address space 245; original data block (also called "original logical block") 251; second-tier module 242; fast access physical address space 246; medium access physical address space 247; slow access physical address space 248; and revised data block 252.

Server sub-system 102 is, in many respects, representative of the various computer sub-system(s) in the present invention. Accordingly, several portions of server sub-system 102 will now be discussed in the following paragraphs.

Server sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Storage management program 300 is a collection of machine readable instructions and/or data that is used to create, manage and control certain software functions that will be discussed in detail, below, in the Example Embodiment sub-section of this Detailed Description section.

Server sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Server sub-system 102 is shown as a block diagram with many double arrows. These double arrows (no separate reference numerals) represent a communications fabric, which provides communications between various components of server sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for server sub-system 102; and/or (ii) devices external to server sub-system 102 may be able to provide memory for server sub-system 102.

Storage management program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Storage management program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to server sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, storage management program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
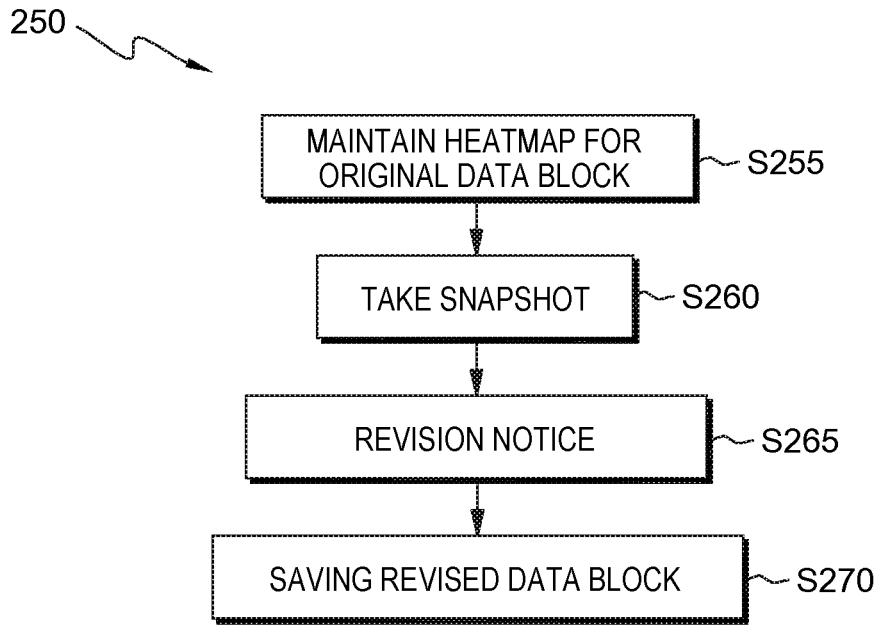
FIG. 2 is a flowchart showing a first embodiment method performed, at least in part, by the first embodiment system.
Figure 3:
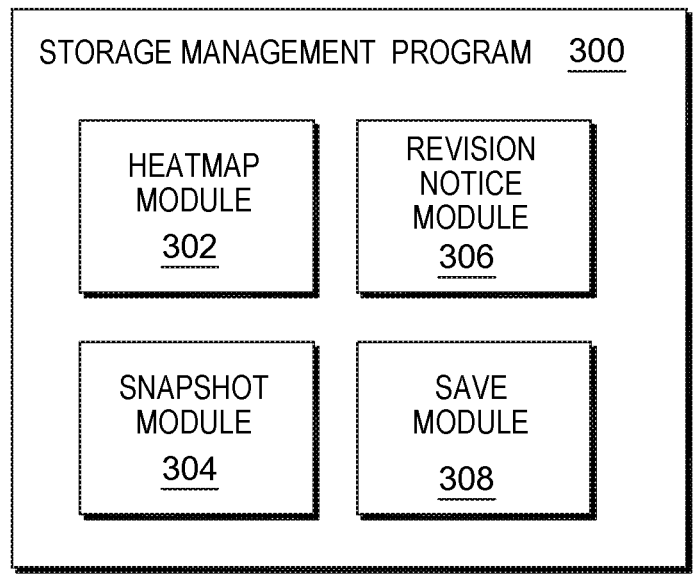
FIG. 3 is a block diagram showing a machine logic (for example, software) portion of the first embodiment system.

FIG. 2 shows flowchart 250 depicting a method according to the present invention. FIG. 3 shows storage management program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where heatmap module 302 of storage management program 300, collects and maintains (that is "generates") a first heatmap (see definition, below). This heatmap reflects access operations performed with respect to original data block (also called "original logical block") 251 previously saved in the fast access physical address space 245 of first tier module ("mod") 241 of multi-tier file system device 240 (see FIGS. 1A and 1B). In this embodiment, first heat map is generated by counting all access operations made to data block, regardless of: (i) whether it is read type, write type or other type of access; (ii) amount of data of the block that is implicated in the access operation; (iii) time between successive access operations; (iv) how long in the past the access operation occurred; (v) the identity of the program or software making the access and/or using the results of the access operation; and/or (vi) time of day/calendar date/ scheduling with respect to scheduled backups and/or defragmentations, etc. Alternatively, in other embodiments, a heatmap may discount certain access and/or types of access, and/or differently weight different accesses depending upon the specific characteristics of a given access operation.

Processing proceeds to operation S260, where snapshot mod 304 takes a snapshot that includes the first logical block as previously saved in space 245 of mod 241 of device 240 (see FIG. 1B).

Processing proceeds to operation S265, where revision mod 306 receives an indication that original logic block 251 (see FIG. 1B) is going to be revised (which means that original logic block 251 will be copied (albeit in a revised form) to a revised logical block). More specifically, in this example, original logic block 251 was copied to fast access physical address space 245 of first-tier mod 241 of multi-tier file system device 240 after a previous revision to its data. Alternatively, original logical block 251 may have been written to space 245 immediately upon its genesis.

Multi-tier file system device 240 is a device that stores data corresponding to a file system using more than one "tier" of storage. In this embodiment, device 240 has two tiers as follows: (i) first-tier mod 241, which is a solid state storage device where all of its physical locations are accessible at substantially the same (very fast speed); and (ii) second-tier mod 242 is a disk based storage device that has storage locations in three access speed zones (fast space 246 near outer circumferential edge of disk, slow space 248 near center of disk and medium space 247 between fata and slow spaces). Compared to first-tier mod 241, second-tier mod 242 provides slower access to saved data, even in its fastest space 246. Alternatively, some storage systems controlled according to embodiments of the present disclosure may have more, or fewer, tiers. Also, as demonstrated by first-tier mod 241, some tiers may have storage space which is subject to a substantially uniform access speed. However, in most, if not all, embodiments of the present disclosure, some physical storage locations will experience faster access than others. In this example, original logical block 251 is stored in the fastest accessible space available in device 240. This storage space is relatively desirable, and in some embodiments, is preferably reserved for data that will be accessed frequently.

In this embodiment, multi-tier file system device 240 is part of external device set 214 of sub-system 102. Alternatively, device 240 could be an integrated part of computer 200 (see FIG. 1A). As a further alternative, device 240 could be located in client computer sub-systems 104, 106 (see FIG. 1A). As yet a further alternative, device 240 could be distributed among different physical locations.

Processing proceeds to operation S270, where: (i) heatmap mod 302 generates a heatmap of predicted accesses to the logical block after it is revised; (ii) save mod 308 selects a second physical storage location for saving the revised logical block based, at least in part, upon the heatmap of predicted accesses; and (iii) save mod 308 saves the revised version of original logical block 251 as revised logical block 252.

In this embodiment, the map of predicted accesses (sometimes herein referred to as a second heatmap) is identical to the heatmap generated at operation S255 because it is assumed that future accesses of the revised logical block will be similar to past accesses of the original logical block. Alternatively, the second heatmap may be based upon the first heatmap without being identical to it, for example: (i) recent accesses may be weighted more heavily than long-ago accesses in the second heatmap; (ii) the second heatmap may only count accesses from the first heatmap that are made by certain pieces of time-critical, low-latency software; and/or (iii) the second heatmap may consider the rate of change access frequency, taken over time, and make an adjustment to the access count of the operation S255 heatmap based on that.

In this embodiment, the heatmap of operation S255 indicated that original data block 251 was not being accessed very frequently at all. For this reason, the physical storage location for the revised logical block was chosen to be in 248 slow space of relatively slow access tier 242 (see FIG. 1B). This slow access will likely be acceptable because revised data block 252 will probably not be accessed very often. Alternatively, if the slow space 248 of mod 242 were full, then revised logical block 252 might be chosen to be located in medium space 247 of second-tier mod 242 of multi-tier file system device 240.

Some embodiments of the present invention may place the active and inactive logical blocks on faster or slower portions of a storage device, based on the heatmap distribution data set, where the storage device is any type of storage device that has storage addresses that perform relatively faster or slower than other storage addresses on the device. Physical placement of inactive and active logical blocks is described in further detail below, in section III (Further Comments and Embodiments) of this detailed description, and with reference to FIG. 6).

III. Further Comments and/or Embodiments

In some embodiments of the present invention, inner tracks of a disk type storage device are combined as one storage tier whereas outer tracks are combined as another storage tier and the speed difference between these two storage tiers becomes a differentiating factor.

The following terminology is used in connection with a file or part of a file, herein called a "data block": (i) FBi—file block—refers to a data block wherein FBi holds the address of a logical block corresponding to the data; (ii) LBnnn—logical block—the data block at a storage system physical address; (iii) DataX—the data included within a logical block.

In a conventional multi-tier storage device, when a client program attempts to read from, or write to a data file, the program refers to a corresponding file block. The file block points to a corresponding logical block where the data is stored.

Consider an illustrative example wherein a snapshot is taken for backup purposes only, in a conventional copy-on-write (COW) storage system, and the client program will access only the latest data (also referred to as the "live data", or the "primary data", or the "active data block"). Before the snapshot is taken, the file block (FB0 in this example) points to a logical block (LB100 in this example). LB100 includes DataA, the active data block. LB100 is identified, in this example, as a "hot block" due to a large number of accesses in the history of DataA. Therefore, LB100 has been placed in outer track(s) of the storage device. After the snapshot is taken, and a first post-snapshot write operation on FB0 is about to be performed: (i) a new logical block, LB200, is allocated; (ii) a copy of DataA is made; (iii) the copy of DataA is updated according to the write operation; (iv) the updated copy of DataA is stored as DataB in LB200; (v) FB0 is updated to point to LB200, making DataB the active data block (and making DataA an inactive data block); (vi) DataB initially shows an access history of zero because it has just come into existence and has not yet been accessed; and/or (vii) the conventional multi-tier learning algorithm places LB200, including DataB, on inner tracks (based on the access history), resulting in a sudden performance degradation.

With regard to the example presented in the paragraph above, some embodiments of the present invention recognize the following facts, potential problems and/or potential areas for improvement with respect to the conventional multi-tier storage device after a snapshot is taken and a first post-snapshot operation to write to FB0 is about to be processed: (i) LB100 becomes inactive; (ii) LB100 remains in outer disk tracks (due to its identity as a "hot block"); (iii) LB100 is no longer required by any user application and unnecessarily takes up outer disk track space that could be used more advantageously for other data (including LB200), resulting in under-utilization of outer disk track space; (iv) initially having no access history, LB200 is not identified as a "hot" block and is therefore placed on inner disk tracks; (v) after the snapshot, a user program continues to access FB0, which now points to LB200; (vi) LB200, not yet having been accessed sufficiently to be identified as a "hot" block, will stay in the inner disk tracks; and/or (vii) after taking of the snapshot and a first post-snapshot write operation against FB0, user program performance, relative to FB0, is suddenly degraded which may further result in unexpected consequences in the user program behavior. The foregoing example applies when a snapshot is taken for backup purposes only, and the user program accesses only the live data.

During a first write after snapshot, when a new logical block is assigned to a given application block, some embodiments of the present invention may include one, or more, of the following features, characteristics and/or advantages: (i) provides efficient management of high performance tiers in multi-tier architecture; (ii) transfers heatmap (sometimes referred to herein as "access history") information from an existing logical block to a new logical block; (iii) based on application behavior, predicts whether data is going to be accessed from (a) a snapshot copy (inactive data), (b) from the live data (active data), and/or (c) distributing access history between the snapshot copy and the live data.

With respect to item (iii) in the paragraph above, the amount of heat information to be transferred can be: (i) completely transferred, wherein the snapshot is created exclusively for backup purposes, user application programs do not require access to snapshot data, and user programs access data only from the latest data; (ii) none transferred, wherein user applications access only snapshot data and the latest data is not required (for example, backup applications such as conventional network data management protocol (NDMP) or cloud gateways, disaster recovery applications, analytic tools etc.) or (iii) partially, wherein both snapshot data and latest data (latest blocks) are equally important.

In some embodiments of the present invention, for a given tuple [OldBlock (inactive data), NewBlock (latest data)], a file system informs a multi-tier environment with heatmap transfer percentages, during block flush operation. A multi-tier monitoring daemon: (i) updates its monitoring statistics for the OldBlock and the NewBlock based on the percentages of heat transfer value; and/or (ii) based on the monitoring statistics, decides whether to place block chunks (logical blocks) on the outer disk tracks or the inner disk tracks.

In some embodiments of the present invention, during snapshot creation, based on the purpose of the snapshot, system administration creates a value that represents an estimated distribution of application accesses to the snapshot data (inactive data) versus accesses to the live data (latest data). The value "snapAccessPattern" is passed as input to the snapshot create command, as will be explained in greater detail below. The estimated distribution value is stored in file system snapshot metadata information tables, for example in a Snapshot Percentage Table (see Snapshot Percentage Table below). The value of snapAccessPattern is referenced during a first write operation after a snapshot is created, that is, when a new logical block is allocated.

In some embodiments of the present invention, after creation of a snapshot, a first operation to write new data to a file block FB0 with new data (DataB) results in: (i) allocation of a new logical block, LB200; (ii) the old data (DataA) remains in the old logical block, LB100; and/or (iii) new data (DataB) goes into LB200.

Figure 4:
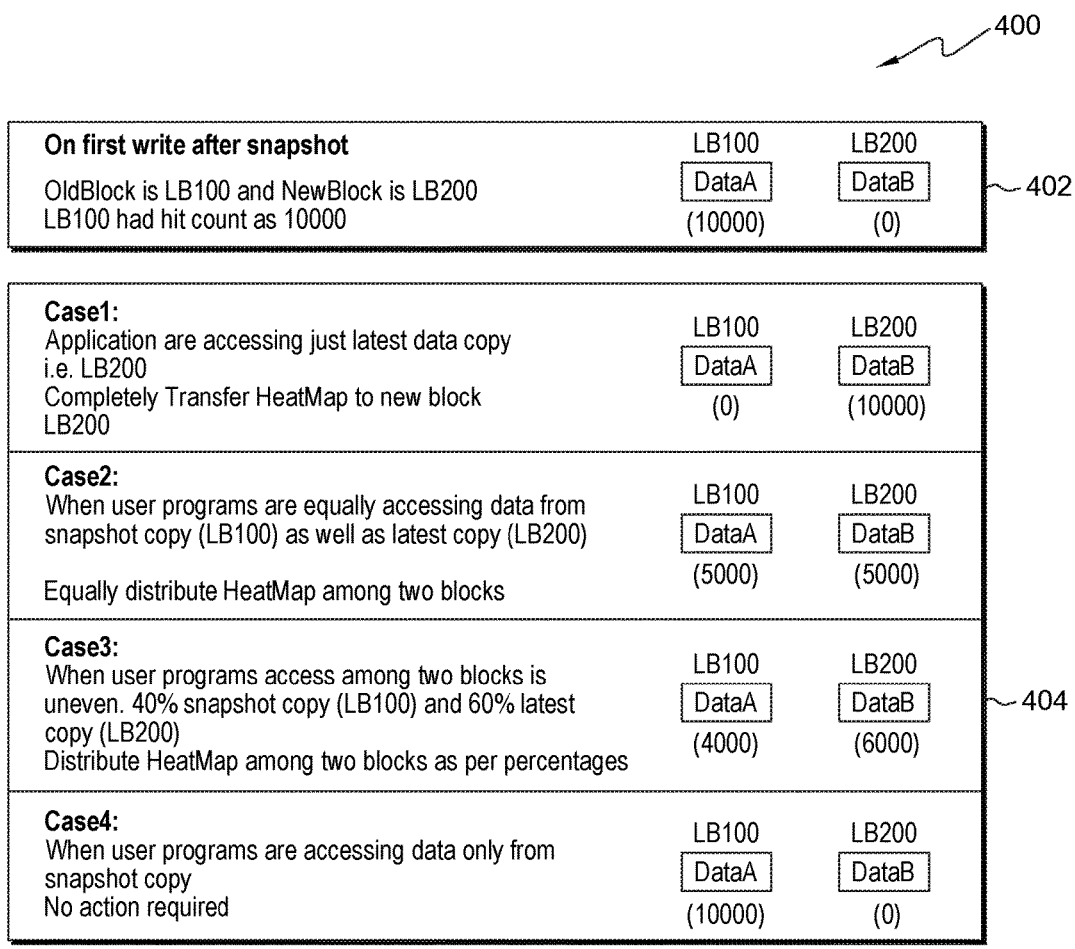
FIG. 4 is a table showing information that is helpful in understanding embodiments of the present invention.

As shown in table 400 of FIG. 4, case 3 (row 404), accesses by application programs are unevenly split between blocks LB100 and LB200. Before a first write (to LB200) after snapshot (see row 402), LB100 had an access count value of 10,000. In case 3 (row 404), it is predicted that user programs will access LB100 and LB200 with a 40%-60% distribution (that is, 40% of future accesses will be against LB100 and 60% will be against LB200). Some embodiments of the present invention transfer heatmap information based on the 40%-60% distribution. Examples of programs that use snapshot data include: (i) backup applications (as the data is consistent (not subject to modification) as opposed to live data, and the backup can be configured to recur at shorter or longer intervals based on the criticality of data); and/or (ii) disaster recovery tools, which replicate consistent (snapshot) data from a primary site to a remote site and the replication rate is configured with lowest recovery time objective (RTO) and recovery point objective (RPO) (that is the snapshot data is accessed more frequently in order to comply with the RPO).

After taking of the snapshot, multi-tier monitoring module is informed to reduce the recorded number of accesses for LB100 (the snapshot copy), to 4000 (40%) and the remaining access count of 6000 (60%) is transferred to LB200. Based on a multi-tier heat threshold value, the multi-tier relocation module can determine placement of these blocks (LB100, LB200) as to whether they will be stored on inner or outer disk tracks. By this method, a user program will experience no significant change in I/O latency and/or performance after taking of a snapshot.

In some embodiments of the present invention, communication between the file system and a multi-tier device is implemented in at least one of the following manners: (i) by use of a separate out-of-band protocol; and/or (ii) by use of reserved fields in the write small computer system interface command descriptor block (SCSI CDB). Some conventional systems implement a mechanism to communicate the heatmap from one storage system to another, to ensure that in a failover to a remote copy, the correct data will be stored in outer disk tracks. In contrast, the communication mechanism, in some embodiments of the present invention, is used for communication of percentage heat transfer value from application to the multi-tier device.

In some embodiments of the present invention, copy-on-write operation is performed at the granularity of the file system block size. A multi-tier storage device monitors heatmap information at the extent level which can consist of multiple file system block size. Enterprise applications modify files according to their requirements which may involve modifying multiple file system blocks at the same time. For example, a database type application modifies data at the granularity of a user record. If the file system block size is 16 megabytes (MB) and a user record is 128 MB, a single user record modification by the database application results in modifying 8 blocks at the file system level. In some embodiments of the present invention, the heat transfer mechanism is highly efficient when the application access size is comparable with the multi-tier extent size.

Some embodiments of the present invention perform the following operations, not necessarily in the order presented: (i) maintaining snapshot percentage information at file system; (ii) deciding percentage of distribution during snapshot creation; (iii) passing percentage information to the multi-tier algorithm/mechanism; and/or (iv) handling percentage information at multi-tier. The aforementioned operations will now be explained in greater detail in the following paragraphs.

Maintaining snapshot percentage information at file system:

As shown in Snapshot Percentage Table below, snapshot percentage information is maintained by the file system as snapshot metadata. In some conventional systems, snapshot metadata includes (i) a snapshot name (column: SnapshotName) for each active snapshot; (ii) timestamp information about each active snapshot (column: SnapCreateTime); and/or (iii) other fields (not separately shown in the table). In some embodiments of the present invention, a new column (column: Old Percentage Value) is added to Snapshot Percentage Table to store "old percentage value" which contains access percentage information (also called snapAccessPattern) in terms of how many blocks are accessed from an old (inactive) version versus latest (active) version of the data.

| SNAPSHOT PERCENTAGE TABLE | | |
|---|---|---|
| SnapshotName | SnapCreateTime | Old Percentage Value (snapAccessPattern) |
| Snap1 | 12 Aug. 2013 00:00:00 | 50 |
| Snap2 | 13 Aug. 2013 06:30:00 | 100 |
| Snap3 | 14 Aug. 2013 06:30:00 | 60 |

Deciding percentage of distribution during snapshot creation:

To determine how to distribute the old percentage value between an "old" logical block (inactive version) and a "new" logical block (active version), the following mechanism is used in some embodiments of the present invention.

In some conventional systems, a file system snapshot is created using a command line interface with a command such as:

createSnapshotFS--snapName SnapshotName

System administration, either manually and/or through automated scripts, invokes createSnapshotFS to create a snapshot of the given name. A snapshot can be created for various purposes including checkpointing and cloning/replication.

In checkpointing, a read-only "moment-in-time" snapshot of a file system is created, such that the file system can later be restored to the state it had at the moment the snapshot was created. In checkpointing cases, user programs access data from latest data and not from an earlier version (inactive data). An example of a command to create a checkpointing snapshot follows:

createSnapshotFS--snapName "checkpointSnap1"// snapshot created for check-pointing purpose In cloning/replication, a moment-in-time image of the file system is created and data from that image is copied to another location (such as a remote storage device). In cloning/replication cases, user programs access data from the snapshot copy and not from the latest version. An example of a command to create a cloning/replication snapshot follows:

createSnapshotFS --snapName "replicationSnap1"
// snapshot created for replication purpose At the time of snapshot creation, system administration knows the purpose of creating the snapshot, whether it is for checkpointing, replication, or some other usage. Therefore, it is possible for system administration to determine whether a user program is going to access data from snapshot copy, the latest version, or both. Some embodiments of the present invention modify the createSnapshotFS command to get this information from the administration.

Some embodiments of the present invention modify operation of some conventional systems as described above by introducing a new argument such as "snapAccessPattern" to specify "SnapAccess %". "SnapAccess %" indicates percentages of data a user program is going to access inactive data compared to accesses of active data. Two examples below show commands, used in some embodiments of the present invention, to create a snapshot for checkpointing and a snapshot for cloning/replication:

```
# createSnapshotFS --snapName "checkpointSnap1" --
snapAccessPattern "0" // No data access from inactive version
# createSnapshotFS --snapName "replicationSnap1" --
snapAccessPattern "100" // Data access only from inactive
version
```

In some embodiments, if user programs are predicted to access data from both inactive and active data, administration can determine a usage pattern, based on past access behavior, and assign a SnapAccess value. For example, if administration determines 40% of overall access will be from the inactive data and the remaining 60% are from live data, the following example command is issued:

```
# createSnapshotFS --snapName mixedUsageSnap1 --
snapAccessPattern "40" // 40 % Data access from inactive version
and remaining from active version.
```

The file system internally updates the "Old Percentage Value" entry for a given snapshot (see the column "Old Percentage Value" in Snapshot Percentage Table above), and uses this value during copy-on-write for heatmap transfer.

Figure 5:
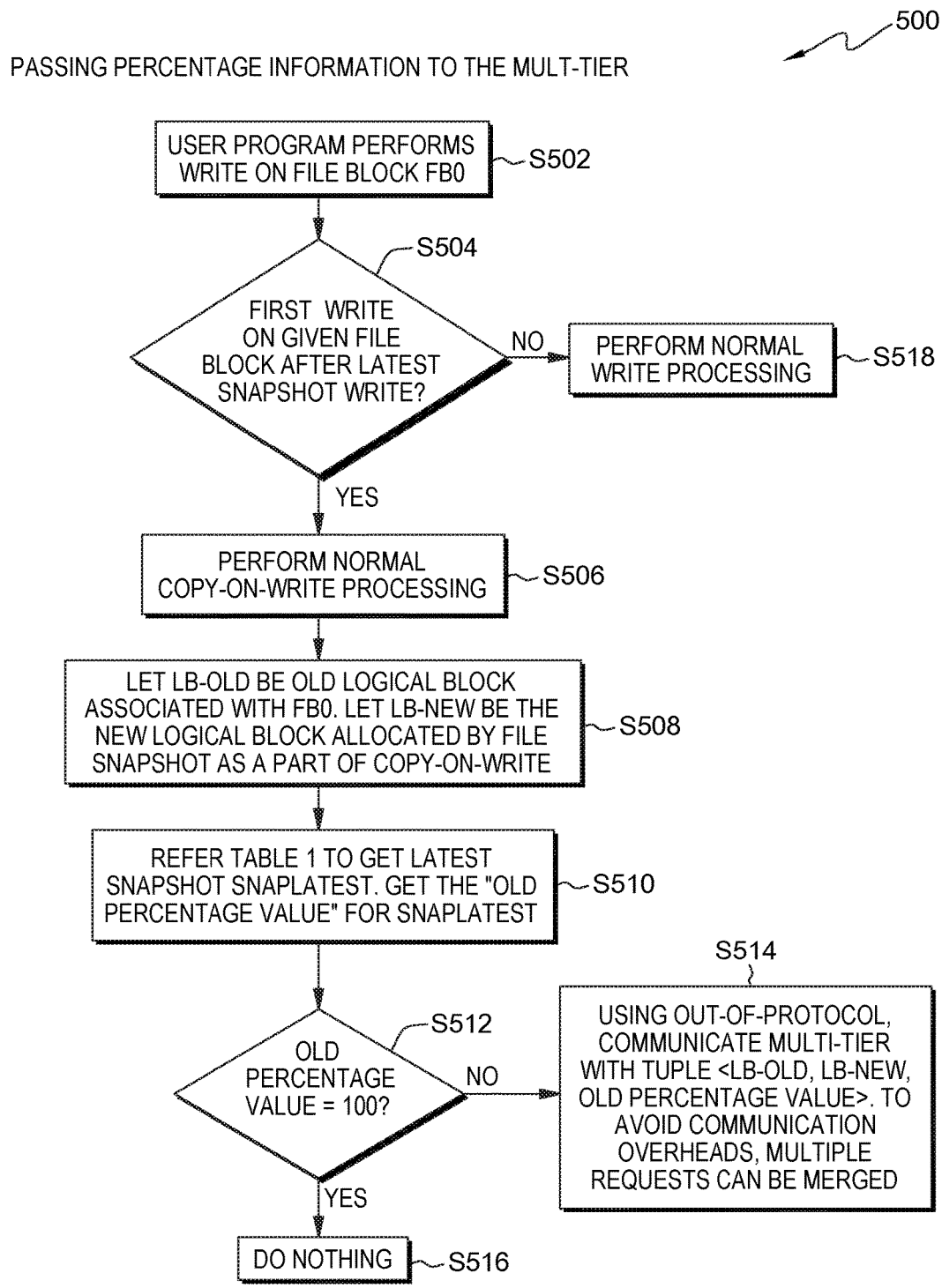
FIG. 5 is a flowchart of a first embodiment of a method according to the present invention.

Passing percentage information to the multi-tier algorithm/mechanism is shown in flowchart 500 of FIG. 5, which includes the following operations (with process flow among and between the operations as shown by arrows in FIG. 5): S502, S504, S506, S508, S510, S512, S514, S516 and S518.

Figure 6:
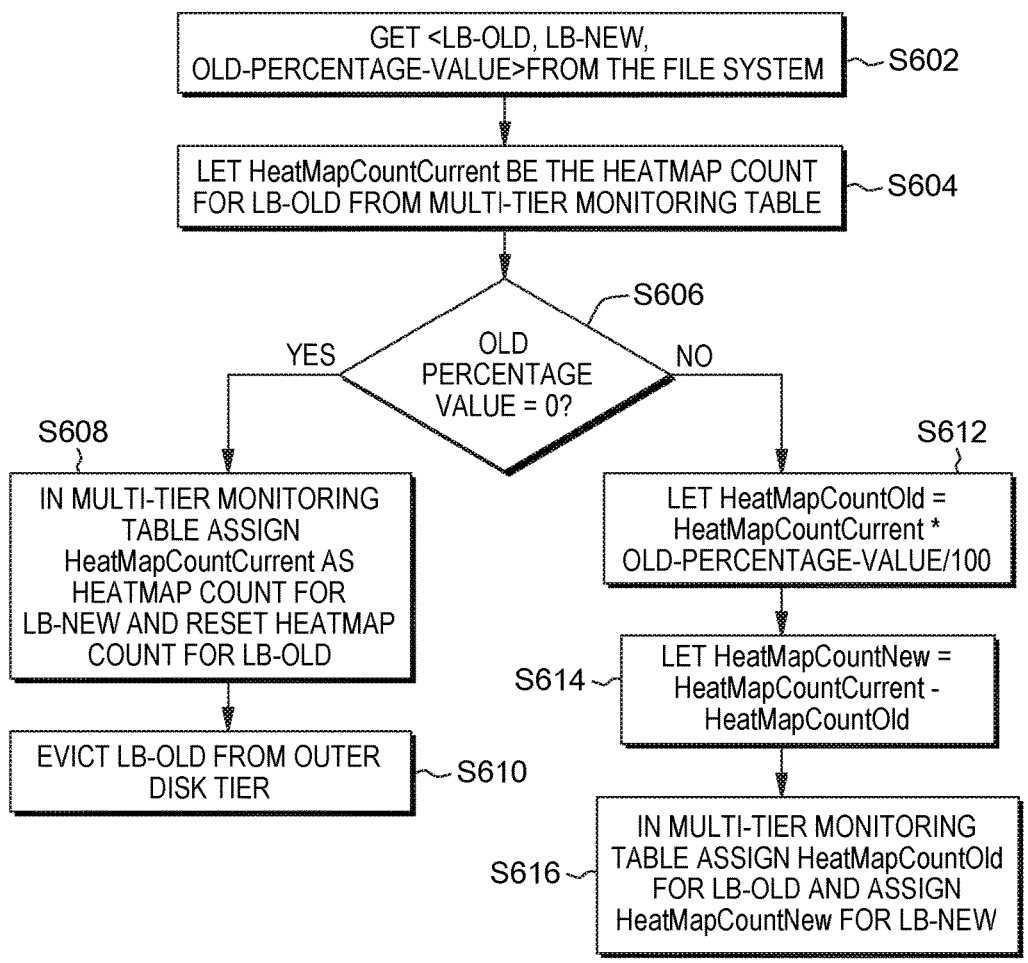
FIG. 6 is a flowchart of a second embodiment of a method according to the present invention.

As shown in flowchart 600 of FIG. 6, percentage information at multi-tier is handled, in some embodiments of the present invention, as follows:

Get <LB-old, LB-new, Old-Percentage-Value>from the file system (operation S602).

"HeatMapCountCurrent" is assigned as the heatmap count for LB-old from a multi-tier monitoring table (not separately shown in the Figures) (operation S604).

If Old Percentage value is 0 (decision S606, "Yes" Branch), in the multi-tier monitoring table, assign HeatMapCountCurrent as heatmap count for LB-new and reset heatmap count for LB-old (operation S608). Evict LB-old from OUTER disk tracks (operation S610).

If the old percentage value is not 0 (decision S606, "No" Branch), the following operations are performed:

```
(S612): HeatMapCountOld = HeatMapCountCurrent ×
OldPercentageValue / 100
(S614): HeatMapCountNew = HeatMapCountCurrent −
HeatMapCountOld
```

(S616): In multi-tier monitoring table assign HeatMapCountOld for the inactive data block (LB-old) and assign HeatMapCountNew for the active data block (LB-new).

Although the present disclosure discusses cases when multi-tier monitoring is done at the file system block level, in general similar implementations can be done at other file system levels, including at the file level, at database record level, at the storage medium sector level, etc.

Some embodiments of the present invention may include one, or more, of the following features, characteristics and/or advantages: (i) keeps track of outer vs. inner partition for erasure coded/fixed layout; (ii) based on application behavior, determines whether data is going to be accessed from snapshot (inactive data) or from the latest data (active data), based on which heatmap is calculated; and/or (iii) transfers the heatmap to the logical snapshot chunks during first write.

Some embodiments of the present invention may include one, or more, of the following features, characteristics and/or advantages: (i) solves a physical issue on disk storage device, that is, the storage device performs better on the outer zone of a disk platter than on the inner zone; (ii) detects different input/output (I/O) scenario issues to improve the performance of a taken snapshot; (iii) provides efficient management of high performance tiers in multi-tier architecture such that during first write after snapshot, when a new logical block is assigned to given application block; (iv) transfers heatmap information from an existing logical block to a new logical block; (v) based on application behavior (whether data is going to be accessed from snapshot copy or latest data) decides how much of the heatmap information is transferred from the old logical block to the new logical block.

The amount of the heatmap information that is transferred can be: (i) 100% (when, for example (a) the snapshot is created only for backup, (b) data in the snapshot is not required, and/or (c) applications are configured to access data from only the latest data); (ii) 0% (when applications access only snapshot (inactive) data and the latest (active) data is not required); or (iii) mixed (any percentage between 0% and 100%, in proportion to accesses predicted to be taken from inactive data versus active data, for example 50% when both inactive and active blocks are predicted to be accessed in equal amounts).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi)

mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

User/subscriber: includes, but is not necessarily limited to, the following: (i) a single individual human; (ii) an artificial intelligence entity with sufficient intelligence to act as a user or subscriber; and/or (iii) a group of related users or subscribers.

Logical block: a subset of digital bits that make up a file. A file may consist of one or more logical blocks. In a storage device such as a hard drive, a logical block is mapped to a physical address on the storage device.

Heatmap: a record of access history (and/or predicted future accesses) of a logical block (see definition above), potentially including information such as: (i) frequency of access by application programs that access the block; (ii) mean time between access events; (iii) which application programs access the block; (iv) proportion of reads versus writes for each application program that accesses the block; and/or (v) other aspects that are meaningful in embodiments of the present invention.

What is claimed is:

1. A computer program product (CPP) comprising:
a computer readable storage medium; and
computer code stored on the computer readable storage medium, the computer code including data and instructions for causing a processor(s) set to perform at least the following operations:
storing a first version of a first data block at a first physical location in a data storage system, with the first physical location corresponding to a first logical location; generating a first file block data set including information indicative of a pointer to the first logical location in the data storage system,
generating a first heatmap value indicative of a number of accesses of the first data block,
receiving a request to write additional data to create a second version of the first data block to the data storage system,
responsive to the receipt of the request, predicting, by machine logic, a first proportion of future predicted accesses that will be made to the first version of the first data block;
revising the first heatmap value to obtain a revised first heatmap value, with the revision of the first heatmap value being based upon the first proportion of future predicted accesses that will be made to the first version of the first data block;
further responsive to the receipt of the request, predicting, by machine logic, a second proportion of future accesses that will be made to the second version of the first data block, and
generating a second heatmap value indicative of a number of accesses of the first data block, with the second heatmap data set being based upon the first heatmap value and the second proportion of future accesses that will be made to the second version of the first data block.

2. The CPP of claim 1 wherein the computer code further includes data and instructions for causing the processor(s) set to:
select a second physical location in the data storage system for writing the second version of the first data block based, at least in part upon the second heatmap value; and
writing the data of the second version of the first data block at the second physical location in the data storage system.

3. The CPP of claim 2 wherein the computer code further includes data and instructions for causing the processor(s) set to:
select a third physical location in the data storage system for re-writing the first version of the first data block based, at least in part upon the revised first heatmap value; and
re-writing the data of the first version of the first data block at the third physical location in the data storage system.

4. The CPP of claim 1 wherein the computer code further includes data and instructions for causing the processor(s) set to:
select a second physical location in the data storage system for re-writing the first version of the first data block based, at least in part upon the revised first heatmap value; and
re-writing the data of the first version of the first data block at the second physical location in the data storage system.

5. The CPP of claim 1 wherein:
the revision the first heatmap value, to obtain a revised first heatmap value, includes multiplying the first heatmap value by the first proportion of future predicted accesses that will be made to the first version of the first data block; and
the generation of the second heatmap value includes multiplying the first heatmap value by the second proportion of future predicted accesses that will be made to the second version of the first data block.

6. A computer system (CS) comprising:
a processor(s) set;
a computer readable storage medium; and
computer code stored on the computer readable storage medium, the computer code including data and instructions for causing the processor(s) set to perform at least the following operations:
storing a first version of a first data block at a first physical location in a data storage system, with the first physical location corresponding to a first logical location; generating a first file block data set including information indicative of a pointer to the first logical location in the data storage system,
generating a first heatmap value indicative of a number of accesses of the first data block,
receiving a request to write additional data to create a second version of the first data block to the data storage system,
responsive to the receipt of the request, predicting, by machine logic, a first proportion of future predicted accesses that will be made to the first version of the first data block;
revising the first heatmap value to obtain a revised first heatmap value, with the revision of the first heatmap value being based upon the first proportion of future predicted accesses that will be made to the first version of the first data block;

further responsive to the receipt of the request, predicting, by machine logic, a second proportion of future accesses that will be made to the second version of the first data block, and generating a second heatmap value indicative of a number of accesses of the first data block, with the second heatmap data set being based upon the first heatmap value and the second proportion of future accesses that will be made to the second version of the first data block.

7. The CS of claim 6 wherein the computer code further includes data and instructions for causing the processor(s) set to:

select a second physical location in the data storage system for writing the second version of the first data block based, at least in part upon the second heatmap value; and writing the data of the second version of the first data block at the second physical location in the data storage system.

8. The CS of claim 7 wherein the computer code further includes data and instructions for causing the processor(s) set to:

select a third physical location in the data storage system for re-writing the first version of the first data block based, at least in part upon the revised first heatmap value; and re-writing the data of the first version of the first data block at the third physical location in the data storage system.

9. The CS of claim 6 wherein the computer code further includes data and instructions for causing the processor(s) set to:

select a second physical location in the data storage system for re-writing the first version of the first data block based, at least in part upon the revised first heatmap value; and re-writing the data of the first version of the first data block at the second physical location in the data storage system.

10. The CS of claim 6 wherein:

the revision the first heatmap value, to obtain a revised first heatmap value, includes multiplying the first heatmap value by the first proportion of future predicted accesses that will be made to the first version of the first data block; and the generation of the second heatmap value includes multiplying the first heatmap value by the second proportion of future predicted accesses that will be made to the second version of the first data block.

* * * * *